United States Patent
Ou

(10) Patent No.: US 11,479,058 B2
(45) Date of Patent: Oct. 25, 2022

(54) GLASS EMBEDDED PRODUCT AND METHOD FOR FABRICATING SAME

(71) Applicant: GUANGDONG JIEREN GLASS CO., LTD., Chaozhou (CN)

(72) Inventor: Jieren Ou, Chaozhou (CN)

(73) Assignee: GUANGDONG JIEREN GLASS CO., LTD., Chaozhou (CN)

( * ) Notice: Subject to any disclaimer, the term of this patent is extended or adjusted under 35 U.S.C. 154(b) by 250 days.

(21) Appl. No.: 16/771,678

(22) PCT Filed: Sep. 26, 2018

(86) PCT No.: PCT/CN2018/107493
§ 371 (c)(1),
(2) Date: Jun. 10, 2020

(87) PCT Pub. No.: WO2019/091237
PCT Pub. Date: May 16, 2019

(65) Prior Publication Data
US 2021/0070096 A1    Mar. 11, 2021

(30) Foreign Application Priority Data
Nov. 7, 2017  (CN) .......................... 201711085001.0

(51) Int. Cl.
*B44C 5/00* (2006.01)
*B44C 5/06* (2006.01)
*B29L 31/00* (2006.01)
*B44C 5/04* (2006.01)

(52) U.S. Cl.
CPC ................ *B44C 5/005* (2013.01); *B44C 5/06* (2013.01); *B29L 2031/722* (2013.01); *B44C 5/0407* (2013.01)

(58) Field of Classification Search
CPC ......... B44C 5/005; B44C 5/06; B44C 5/0407; B29L 2031/722
See application file for complete search history.

(56) References Cited

FOREIGN PATENT DOCUMENTS

| CN | 1101028 A | 4/1995 |
|---|---|---|
| CN | 1521090 A | 8/2004 |
| CN | 205661231 U | 10/2016 |
| CN | 107962905 A | 4/2018 |
| CN | 207466212 U | 6/2018 |
| JP | H10-57212 A | 3/1998 |
| JP | 2015-145327 A | 8/2015 |

*Primary Examiner* — Mary Ellen Bowman
(74) *Attorney, Agent, or Firm* — Cheng-Ju Chiang

(57) ABSTRACT

Disclosed are a glass embedded product and a method for fabricating same. The glass embedded product comprises a base, the base having a cavity, several hollowed holes being formed through a side wall of the cavity, and the hollowed holes communicate with the cavity. The glass embedded product further comprises a glass blown decorative structure embedded in the base, the glass blown decorative structure comprising a glass blown lining sheathed in the cavity of the base and glass protruding decorative parts embedded in the hollowed holes of the base. The glass protruding decorative parts and the glass blown lining form an integrated blow-moulded integral structure.

8 Claims, 4 Drawing Sheets

GLASS EMBEDDED PRODUCT AND METHOD FOR FABRICATING SAME

CROSS REFERENCE TO RELATED APPLICATIONS

The present application is a 35 U.S.C. § 371 National Phase conversion of International (PCT) Patent Application No. PCT/CN2018/107493, filed on Sep. 26, 2018, which claims priority of Chinese Patent Application No. 201711085001.0, filed on Nov. 7, 2017, the disclosure of which is incorporated by reference herein. The PCT International Patent Application was filed and published in Chinese.

FIELD OF THE INVENTION

The present invention relates generally to the field of glass decorations, and more specifically to a glass embedded product and a method for fabricating the same.

BACKGROUND OF THE INVENTION

Glass is an amorphous material and cannot be manufactured by conventional methods such as strip mold. The glass products on the market today, such as hot spread paper, hollow animal product, solid animal product, abstract animal forms, and hemp rope crafts, are all based on glassblowing. However, the current blown glass products have monotonous shape and material, the decoration effect is monotonous, and it cannot obtain a blown glass embedded decorative structure.

SUMMARY OF THE INVENTION

Technical Problem

The technical problem to be solved in the present invention is to provide a glass embedded product to solve that the shape, material, product and decorative effect of the glass product are monotonous, and a blown glass embedded decorative structure cannot be obtained.

The technical problem to be solved in the present invention is to provide a method for fabricating a glass embedded product to solve that the prior method cannot prepare blown glass embedded decorative structures.

Technical Solution

To solve the above technical problems, the present invention adopts the following technical solutions.

A glass embedded product comprises a base with a cavity therein and holes defined through a side wall of the cavity; the holes communicates with the cavity; wherein the glass embedded product further comprises a glass decorative structure embedded in the base; the glass decorative structure comprises a glass-blown lining sheathed in the cavity and glass protruding decorative parts embedded in the holes of the base; the glass protruding decorative parts and the glass-blown lining form an integral structure by once blow molding.

The glass decorative structure decorates the base from inside to outside; the glass protruding decorative parts are integrally formed on an outer wall of the glass-blown lining close to an inner wall of the base, protrude outwards and are held at the holes of the base; the glass-blown lining is close to the inner wall of the base and forms a double inner wall of the cavity.

The glass-blown lining overlaps with the inner wall of the base to form the double inner wall of the cavity; a shape and size of the glass-blown lining and the inner wall of the base are adapted to each other; the inner wall of the base is annular, the glass-blown lining is annular and form a double annular wall close to each other with the inner wall of the base.

The cavity is suitable for glass blowing therein; the glass protruding decorative parts are adapted to the holes; the glass protruding decorative parts can have graphics or patterns.

A gap is formed between the glass-blown lining and the inner wall of the base; and a gap is formed between each glass protruding decorative part and a hole wall of the corresponding hole.

The gap includes a space formed by removing a removable protective glue layer after forming the glass decorative structure by glassblowing, where the removable protective glue layer is coated on the inner wall of the base before glassblowing, and is removed to form the space; and an adhesive layer is further filled in the gap.

The removable protective glue layer is a bone glue layer.

In order to solve the above technical problems, further technical solutions adopted by the present invention are as follows.

A method for fabricating a glass embedded product, comprising steps of:

at a first step, providing a base to be decorated: the base having a cavity therein and a plurality of holes defined through a side wall of the cavity, the holes communicating with the cavity;

at a second step, forming a removable protective glue layer on the base to be decorated: applying a removable protective glue on an inner wall and/or in the holes of the base, or immersing the base in the removable protective glue, so that a removable protective glue layer with a predetermined thickness is formed on the inner wall of base and/or hole walls of the holes, and a heat-resistant temperature of the protective glue layer is not lower than the glass melting temperature;

at a third step, blowing a glass decoration structure in the cavity: blowing molten glass in the cavity and thus forming a glass-blown lining in the cavity, and molten glass filling the holes to form glass protruding decorative parts embedded in the holes; and the glass protruding decorative parts and the glass-blown lining being an integral structure formed by once glassblowing; and at a fourth step, removing the protective glue layer: removing the protective glue layer from the inner wall of the base and/or the holes, the space where the protective glue layer is removed correspondingly forming a gap.

At the fourth step, removing the protective glue layer by cleaning: the base with the glass decorative structure is cleaned with a cleaning agent or solvent, and the protective glue layer is dissolved in the cleaning agent or solvent and then removed; the method further comprising a fifth step of: forming an adhesive layer in the gap.

The removable protective glue is bone glue, the protective glue layer is bone glue layer, and the solvent is water.

Advantages

The advantages of the present invention are:
by blowing a glass-blown lining in a hollowed base, and at the same time, the molten glass is extruded into holes during glassblowing to form glass protruding decorative parts, so that ornaments of various shapes and/or sizes can be formed on the surface of the base.

This glass embedded product made by combining blown glass and hollowed base is more pleasing, simple in structure, diverse in decorative effects, and diversified in products. It is possible to blow and form various glass decoration without spending more cost for fixed moulds, which can be applied for any base with a cavity and holes, and is more adaptable.

A further detailed description of the invention is given below in conjunction with the accompanying drawings.

THE BEST EMBODIMENT OF THE INVENTION

Figure 1:
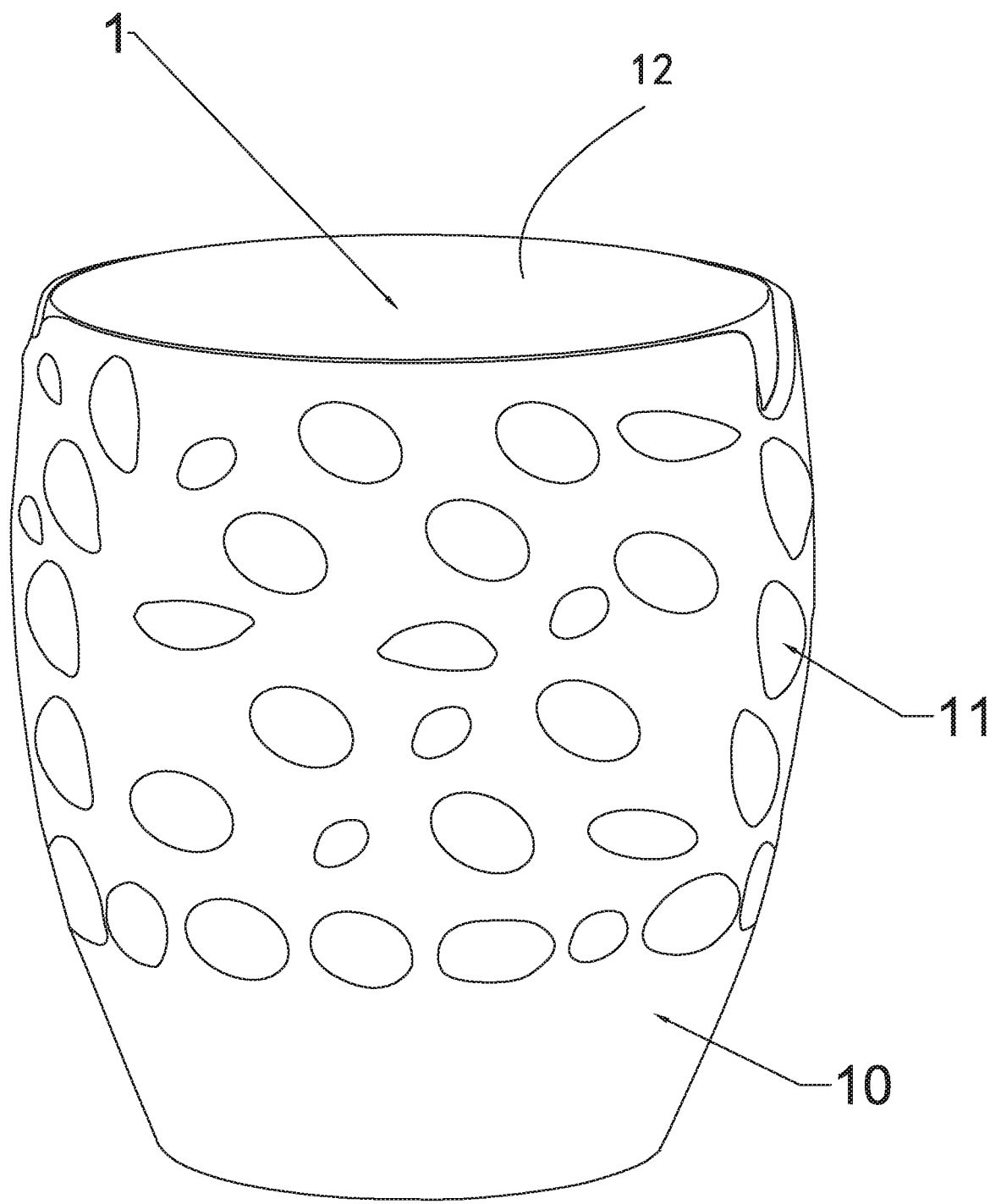
FIG. 1 is a perspective view of a hollowed base in accordance with an embodiment of the present invention.

It should be noted that, in the case of no conflict, the embodiments of the present application and the features in the embodiments can be combined with each other. The present invention will be further described in detail below with reference to the drawings and specific embodiments.

A glass embedded product and a method for fabricating the same in accordance with an embodiment of the present invention, uses a glassblowing process to form glass decoration in various hollowed base, and decorates the base inside and outside, thereby a glass-blown lining is formed inside the base, and glass protruding decorative parts are formed in the holes of the base and are integrally with the glass-blown lining. The decorative effect is excellent, various decorative patterns can be formed, and the process is simple.

Referring to FIGS. 1-4, the glass embedded product 100 in accordance with an embodiment of the present invention includes a hollowed base 10. The hollowed base 10 has a cavity 1 therein and a plurality of holes 11 through the sidewall of the cavity 1, The holes 11 communicate with the cavity 1.

The glass embedded product 100 further includes a glass decorative structure 20 embedded in the base 10. The glass decorative structure 20 includes a glass-blown lining 2 fitted in the cavity 1 and glass protruding decorative parts 21 embedded in the holes 11 of the base 1. The glass protruding decorative parts 21 are integral with and protrude outwards from the outer wall of the glass-blown lining 2 into the holes 11 and is held in the holes 11. The glass protruding decorative parts 21 and the lining 2 are an integral structure formed by a blow molding. The glass protruding decorative parts 21 have shapes and sizes applicable to the corresponding holes 11, are formed by the molten glass flowing into the holes 11 and cooling when blowing molten glass, and thus are firmly and suitably embedded in the holes 11, therefore, the lining 2 and the base 1 are fixed together without detaching.

In some embodiments, based on the principle of surface tension of droplets, some or all of the glass protruding decorative parts 21 may protrude outside of the holes 11; are spherical, arc, curved, or other shapes of bubbles, and may have an end face larger than the holes 11, the bubbles are held at the holes 11, so that the lining 2 and the base 1 can be snapped together at the holes 11, and the glass-blown lining 2 and the base 10 are further fitted to form a reliable embedded structure.

There may be one or more holes 11, correspondingly, one or more glass protruding decorative parts 21 are formed on the outer wall of the lining. The outer wall of the lining 2 faces and is close to the inner wall 12 of the cavity 1.

The glass decorative structure 20 is formed by molten glass blowing and cooling in the cavity 1 of the hollowed base 10.

Referring to FIG. 1 again, the hollowed base 10 in the present invention may be a variety of shapes of object to be decorated made of various materials, may be made of metal or non-metal, such as a ceramic base, a metal base or a wooden base; and may have various shapes, for example, various containers such as cups, bowls, bottles, etc., or other object or supply. The base 10 has an internal cavity 1 suitable for glassblowing, and the blowpipe extends into the cavity 1 for glassblowing. Of course, the holes 11 can also be used as an entrance of the blowpipe for glassblowing, so that the base 10 may not form a separate opening. One or more holes 11 are formed through the side wall of the cavity 1. In one embodiment, the side wall of the cavity 1 is annular, and accordingly, the inner wall 12 of the cavity 1 is annular.

Figure 3:
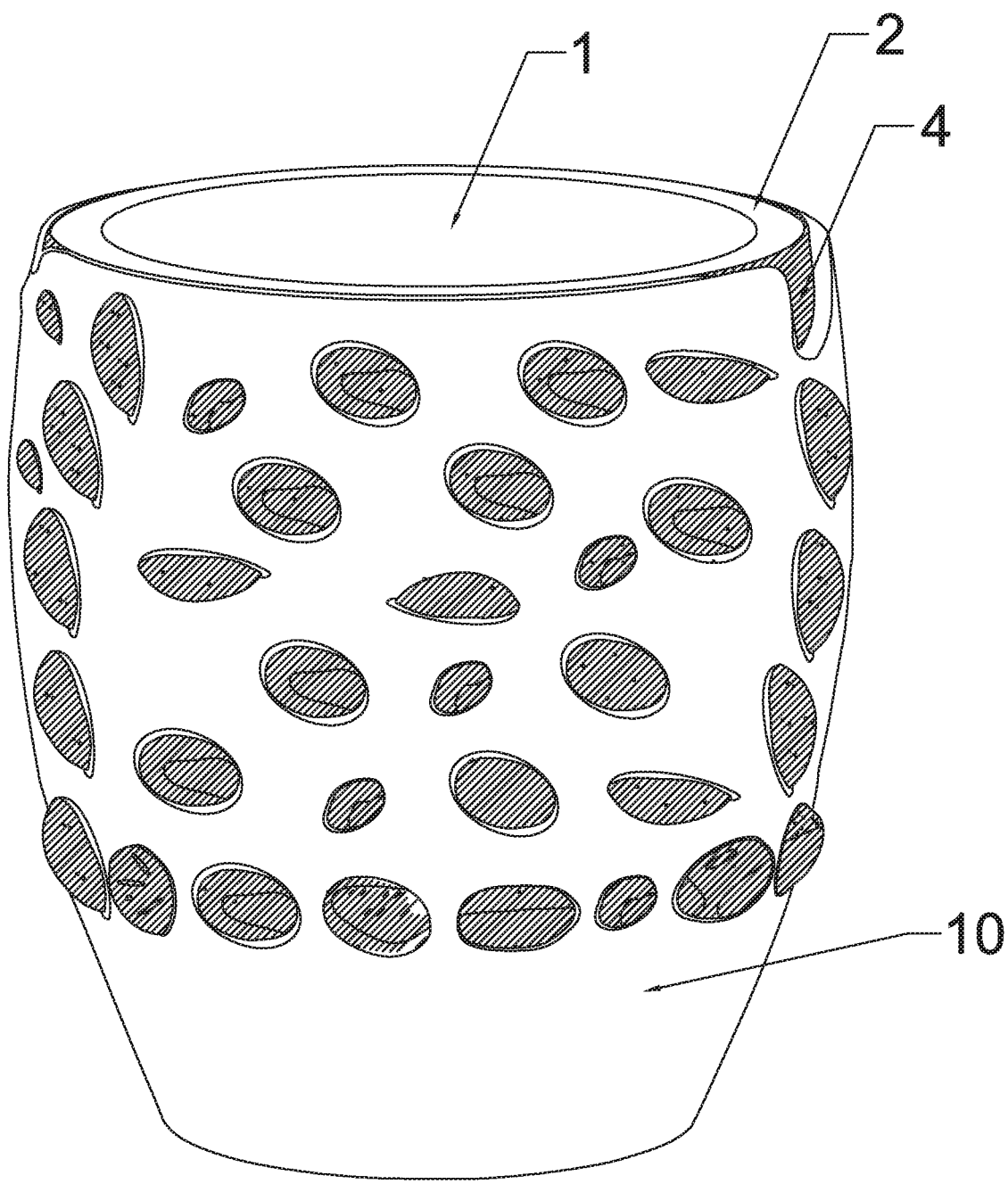
FIG. 3 is a perspective view of the hollowed base after glassblowing therein in accordance an embodiment of the present invention.
Figure 4:
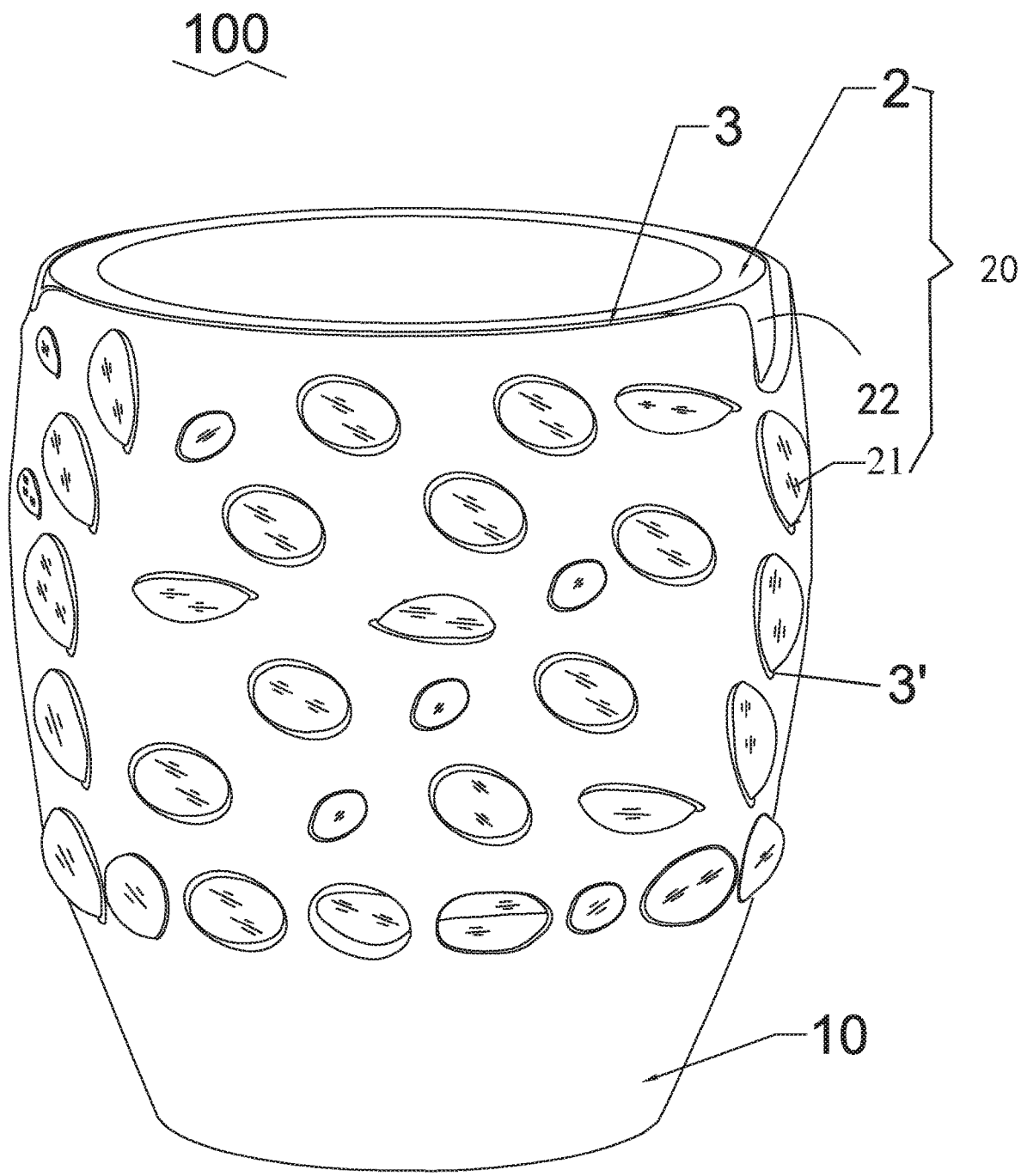
FIG. 4 is a perspective view of a glass embedded product in accordance with the embodiment of the present invention.

Further referring to FIGS. 3-4, the glass-blown lining 2 is formed by blowing and cooling molten glass in the cavity 1 of the hollowed base 1. In one embodiment, the shape of the lining 2 is adapt to the inner wall 12 of the cavity 1 and fits with each other. The glass protruding decorative parts 21 are integral with the glass-blown lining 2 as a whole, and are protrusions formed by cooling the molten glass that fills the holes 11 when the molten glass is blown. One glass protruding decorative part 21 is embedded and held in one hole 11 and can protrude to the outer wall of the base 10. Corresponding to the shape of the hole 11, the glass protruding decorative part 21 can be a single glass bead or other various graphic shape, or can also be various pattern, to form a decorative structure to the base 10.

The glass-blown lining 2 is formed by blowing molten glass into the cavity 1 of the base. In one embodiment, the shape of the glass-blown lining 2 is adapt to the shape of the inner wall 12 of the cavity 1, and is sleeved in the cavity 1 to form double walls of the cavity 1. In some embodiments, the glass-blown lining 2 overlaps the inner wall 12 of the hollowed base 10 in parallel to form double walls of the cavity 1. In this embodiment, the side wall of the lining 2 is annular, and overlaps with the inner wall of the base 10 to form double annular walls of the cavity 1, and inside thereof defines the cavity 1. The lining 2 has an inner wall (not labeled) in the cavity 1, and an opposite outer wall 22 fitted with the inner wall of the base 10 (see FIG. 4). The outer wall 22 is fitted with the inner wall of the base 10 and integrally forms the glass protruding decorative parts 21 embedded in the holes 11, the glass protruding decorative parts 21 are engaged with the holes 11 so that the lining 2 and the base 10 are fitted firmly. At the same time, the glass protruding decorative parts 21 protrude from the holes 11 to form a decorative figure or pattern of the surface of the base, and can form decorative beads of various patterns. Therefore, the decorative effect is beautiful, and the structure is simple and firm.

Further, there is a gap 3 between the glass-blown lining 2 and the inner wall of the hollowed base 10, which can be used to adapt to and adjust the difference in volume change between the glass-blown lining 2 and the base 10 during thermal expansion and contraction. In one embodiment, the gap 3 includes a space formed in such way that a removable (for example, washable) protective glue layer 4 applied to the inner wall of the base 10 before blowing the lining 2, and is removed after blowing the lining 2 to form the corresponding space. Specifically, before blowing the lining, immersing the base 10 completely in washable glue, or coating a removable protective glue directly on the inner wall of the base 10 (might on the outer wall and in the holes) to form a protective glue layer 4; and then performing glassblowing in the cavity 1 and forming the glass-blown lining 2 on the protective glue layer 4 on the inner wall 12 of the cavity. For example, the glass-blown lining 2 is attached to the protective glue layer 4 on the inner wall 12 of the cavity. Therefore, when blowing the glass decorative structure 20, there is the protective glue layer 4 between the outer wall 22 of the formed lining 2 and the inner wall 12 of the cavity. After the glassblowing is finished, washing to remove the washable protective glue layer 4 on the inner wall of the base 10. Correspondingly, after removing the protective glue layer 4, the gap 3 is formed between the inner wall 12 of the cavity and the glass-blown lining 2.

In the same way, a gap 3' is also formed between the glass protruding decorative part 21 and the hole wall of the hole 11. Before blowing the lining 2, the inner wall of the base 10 and the hole are coated with the washable protective glue layer 4; after blowing the lining 2, the corresponding gap is formed after cleaning and removing the protective glue layer 4. Or, the whole base is immersed in the removable protective glue before glassblowing, the inner and outer wall of the base 10 and hole walls of the holes are covered with removable protective glue, after being dried, the inner and outer walls and the holes of the base are coated with the removable protective glue layer 4. After blowing the glass decorative structure 20, the product is cleaned with cleaning agent, and the protective glue layer 4 is dissolved and removed, thus the gap 3' between the glass protruding decorative part 21 and the hole wall of the hole 11 and the gap 3 between the inner wall 12 of the base 10 and the glass-blown lining 2.

The removable protective glue is paint or adhesive that can be dissolved in a cleaning agent such as a solvent, and can be removed by soaking and cleaning. Correspondingly, the removable protective glue layer can be dissolved and removed with a corresponding cleaning agent such as a solvent. The washable protective glue may be water-removable protective glue (i.e. paint or adhesive), and the corresponding protective glue layer is a water-removable protective glue layer (i.e. dissolved in water). The protective glue layer 4 has a heat-resistant temperature not lower than the melting temperature of glass, and can be used to isolate heat and molten glass slag from the base 10 during glassblowing, so that the surface of the base will not be burned or damaged. Preferably, the water-removable protective glue is bone glue, and the formed protective glue layer 4 correspondingly is the protective bone glue layer 4.

In use, before blowing the lining 2, the inner (and outer) wall and the holes of the base are coated with bone glue; or, the base is directly immersed in the bone glue, after being dried, bone glue layer 4 is formed on the inside (outside) wall and in the holes of the base. After blowing the lining 2, the product is soaked and washed with water, the bone glue layer 4 is dissolved in water and then removed from the base 1, accordingly, so as to form a gap 3' between the glass protruding decorative parts 21 and the hole wall of the holes 11 and the gap 3 between the inner wall 12 of the base 10 and the glass-blown lining 2.

Further, in order to make the glass-blown lining 2 and the hollowed base 10 firmly fitted, an adhesive can be injected into the gaps 3, 3' to form an adhesive layer (not shown). The glass glue in the prior art or any adhesive suitable for bonding the base can be selected.

The adhesive layer can be adapted to the expansion coefficient of the glass-blown lining 2 and the hollowed base 10 so that the hollowed base 10 and the glass-blown lining 2 will not be disengaged away from each other, will not be crushed or broken when thermal expansion and contraction.

It can be understood that the glass-blown lining 2 may has various shapes, is formed in the cavity of the base and are integral with the glass protruding decorative parts 21 on the outer wall of the base 10. A distance from the lining 2 to the inner wall of the base 10 can be only the gap 3, or can be different distances to meet the needs of decoration or other functions. Similarly, there are many shapes or patterns of the glass protruding decorative parts 21, and a distance from the glass protruding decorative part 21 to the hole wall can be the gap 3' or different from the gap 3'. The shape, size, and height of the glass protruding decorative parts 21 may be the same or different.

A method for fabricating a glass embedded product 100 provided in accordance with an embodiment of the present invention, comprises the following steps.

At a first step, providing the base 10 to be decorated. Referring to FIG. 1, the base 10 has a cavity 1 and a plurality of holes 11 formed through the side wall of the cavity 1, and the holes 11 communicate with the cavity 1. The cavity 1 of the base 1 is suitable for blow molding of molten glass.

Figure 2:
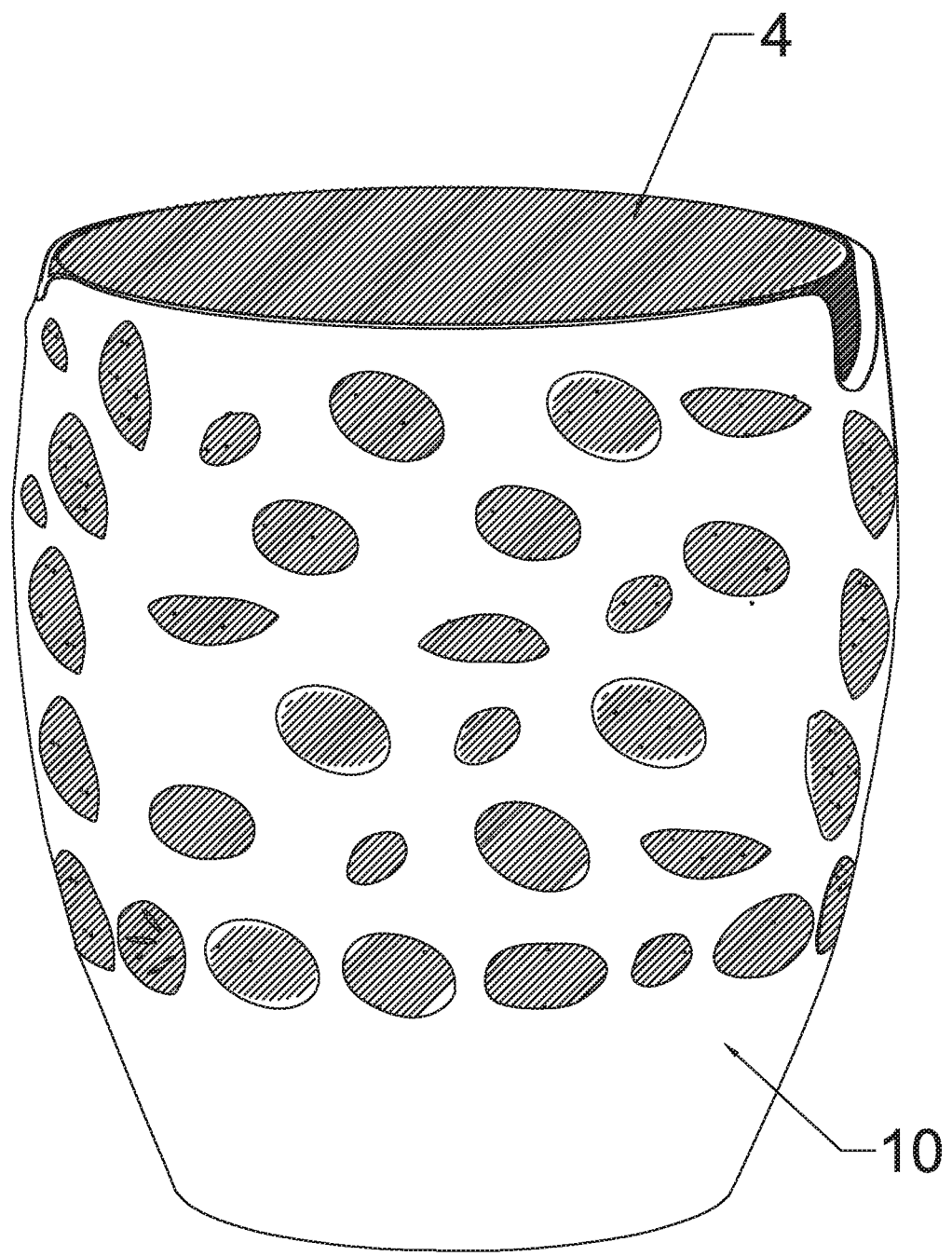
FIG. 2 is a perspective view of the hollowed base covered with a bone glue protective layer on an inner wall in accordance with an embodiment of the present invention.

At a second step, coating a washable protective glue layer 4 on the base 10 to be decorated, and drying it. Referring to FIG. 2, a removable protective glue (e.g. removable by washing) can be applied on the inner wall 12 (and outer wall and holes) of the base 10 to form a removable protective glue layer 4 thereon. Alternatively, the base 10 is immersed in the washable protective glue, so that a protective glue layer 4 with a predetermined thickness is formed on the inner wall, the outer wall of the base 10, and the hole walls of the base. In this embodiment, the washable protective glue is bone glue, which is a type of animal glue, can be dissolved in water and washed away with water. Correspondingly, the protective glue layer 4 is a bone glue layer 4 with a heat-resistant temperature not lower than the working temperature of glassblowing or the temperature of molten glass.

The protective glue layer (or bone glue layer) 4 is used to protect the base 10 from being damaged by molten glass or from thermal deformation, and can insulate and block molten glass from contacting the base 10.

At a third step, blowing the glass decorative structure 20 into the cavity. Referring to FIG. 3, one end of the blowpipe is extended into the cavity 1 and the other end is inserted into molten glass, and glassblowing is performed in the cavity 1, molten glass is blown into the cavity 1 and cooled to form the glass-blown lining 2, and at the same time, molten glass fills the holes and is cooled to form the glass protruding decorative parts 21. The glass-blown lining 2 and the glass protruding decorative parts 21 constitute the glass decorative structure 20.

As an embodiment, the glass decorative structure 20 comprises the glass-blown lining 2 as a parallel double wall of the inner wall 12 of the base 1, and the glass protruding decorative parts 21 formed in the holes 11 of the base. The glass-blown lining 2 in the cavity 1 is fitted to the inner wall 12 of the base 1 and adhered to the bone glue layer 4; and at the same time, molten glass in the holes forms glass protruding decorative parts 21 embedded in the holes 11. The glass protruding decorative parts 21 are integral and indivisible with the glass-blown lining 2 and protrude from the outer wall 22 of the glass-blown lining 2.

It can be understood that the glass-blown lining 2 blown in the cavity 1 may be of various shapes or sizes, which may be the same as or different from the shape of the inner wall of the base 10, may be attached to the inner wall of the base 10, or may be separated from the inner wall. The glass protruding decorative parts 21 formed by molten glass filling the holes may have the same or different shapes, sizes and structures, and may have different gaps from the hole walls and different snapping engagement with the holes.

At a fourth step, removing the protective glue layer. specifically, the product is soaked and cleaned with cleaning agent to obtain the glass embedded product 100 of FIG. 4. Washing the base 10 with the glass decorative structure 20 using a suitable cleaning agent or solvent, in this embodiment, washing with water. The bone glue layer 4 is dissolved in water and completely washed away. The gap 3 is formed between the glass-blown lining 2 and the inner wall 12 of the base 1 where the bone glue layer 4 is removed; and a gap 3' is also formed between each glass protruding decorative part 21 and the corresponding hole wall, and the gap 3, 3' can be used to adjust the difference of thermal expansion coefficients between the base 1 and glass to be adapt to the difference in volume changes thereof due to thermal expansion and contraction. In the final product 100, the glass decorative structure 20 and the base are nested with each other, the structure is fixing, and the base is decorated from inside to outside, the decorative effect is excellent, and the process is simple.

In the present invention, ceramics, metals or other hollowed materials can be used make the base, and coating a water-removable glue layer as a processing layer on the inner wall of the base, and then blowing molten glass onto the processing layer. Molten glass fills the holes, after being cooled, and when forming the glass-blown lining on the inner wall of the base 10, decorative parts in different sizes and shapes are formed in the holes of the base.

Although the embodiments of the present invention have been shown and described, those of ordinary skill in the art can understand that various changes, modifications, substitutions and variations can be made to these embodiments without departing from the principles and spirit of the present invention the protection scope of the present invention is defined by the appended claims and their equivalents.

What is claimed is:

1. A glass embedded product, comprising: a base with a cavity therein, and holes defined through a side wall of the cavity; the holes communicating with the cavity; wherein the glass embedded product further comprises a glass decorative structure embedded in the base; the glass decorative structure comprises a glass-blown lining sheathed in the cavity and glass protruding decorative parts embedded in the holes of the base; the glass protruding decorative parts and the glass-blown lining form an integral structure by once blow molding;

wherein a gap is formed between the glass-blown lining and the inner wall of the base; a gap is formed between each glass protruding decorative part and a hole wall of the corresponding hole; the gap includes a space formed by removing a removable protective glue layer after forming the glass decorative structure by glassblowing, where the removable protective glue layer is coated on the inner wall of the base before glassblowing, and is removed to form the space; and an adhesive layer is further filled in the gap.

2. The glass embedded product of claim 1, wherein the glass decorative structure decorates the base from inside to outside; the glass protruding decorative parts are integrally formed on an outer wall of the glass-blown lining close to an inner wall of the base, protrude outwards and are held at the holes of the base; the glass-blown lining is close to the inner wall of the base and forms a double inner wall of the cavity.

3. The glass embedded product of claim 2, wherein the glass-blown lining overlaps with the inner wall of the base to form the double inner wall of the cavity; a shape and size of the glass-blown lining and the inner wall of the base are adapted to each other; the inner wall of the base is annular, the glass-blown lining is annular and form a double annular wall close to each other with the inner wall of the base.

4. The glass embedded product of claim 1, wherein the cavity is suitable for glass blowing therein; the glass protruding decorative parts are adapted to the holes; the glass protruding decorative parts can have graphics or patterns.

5. The glass embedded product of claim 1, wherein the removable protective glue layer is a bone glue layer.

6. A method for fabricating a glass embedded product, comprising steps of:

at a first step, providing a base to be decorated: the base having a cavity therein and a plurality of holes defined through a side wall of the cavity, the holes communicating with the cavity;

at a second step, forming a removable protective glue layer on the base to be decorated: applying a removable protective glue on an inner wall and/or in the holes of the base, or immersing the base in the removable protective glue, so that a removable protective glue layer with a predetermined thickness is formed on the inner wall of base and/or hole walls of the holes, and a heat-resistant temperature of the protective glue layer is not lower than the glass melting temperature;

at a third step, blowing a glass decoration structure in the cavity: blowing molten glass in the cavity and thus forming a glass-blown lining in the cavity, and molten glass filling the holes to form glass protruding decorative parts embedded in the holes; and the glass protruding decorative parts and the glass-blown lining being an integral structure formed by once glassblowing; and at a fourth step, removing the protective glue layer: removing the protective glue layer from the inner wall of the base and/or the holes, the space where the protective glue layer is removed correspondingly forming a gap.

7. The method of claim 6, wherein at the fourth step, removing the protective glue layer by cleaning: the base with the glass decorative structure is cleaned with a cleaning agent or solvent, and the protective glue layer is dissolved in the cleaning agent or solvent and then removed; the method further comprising a fifth step of: forming an adhesive layer in the gap.

8. The method of claim 7, wherein the removable protective glue is bone glue, the protective glue layer is bone glue layer, and the solvent is water.

* * * * *